March 1, 1966  D. E. TROTTIER  3,237,354
MOBILE COLLAPSIBLE PILE DRIVER
Filed Nov. 23, 1960  5 Sheets-Sheet 1

David E. Trottier
INVENTOR.

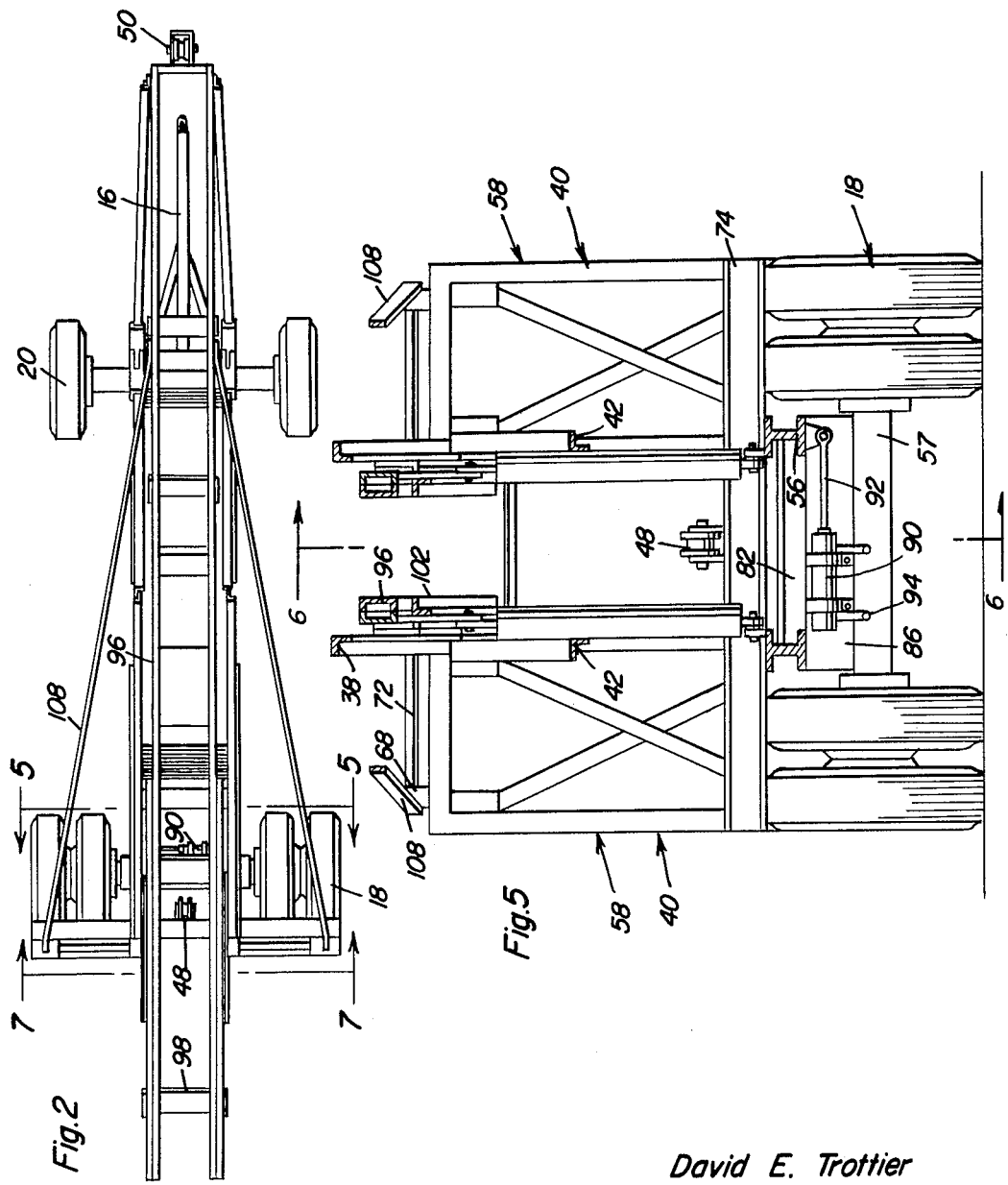

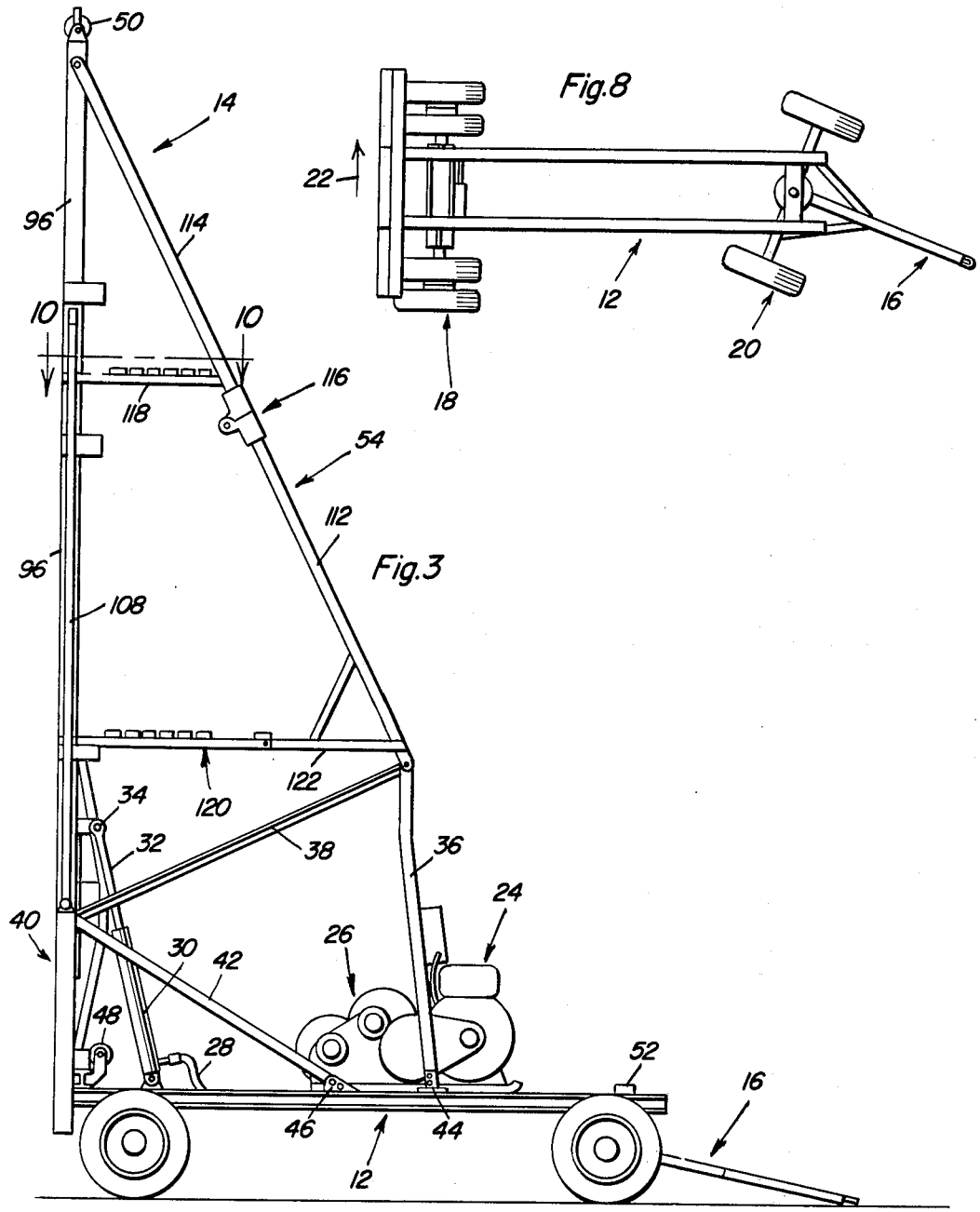

March 1, 1966  D. E. TROTTIER  3,237,354
MOBILE COLLAPSIBLE PILE DRIVER
Filed Nov. 23, 1960  5 Sheets-Sheet 4
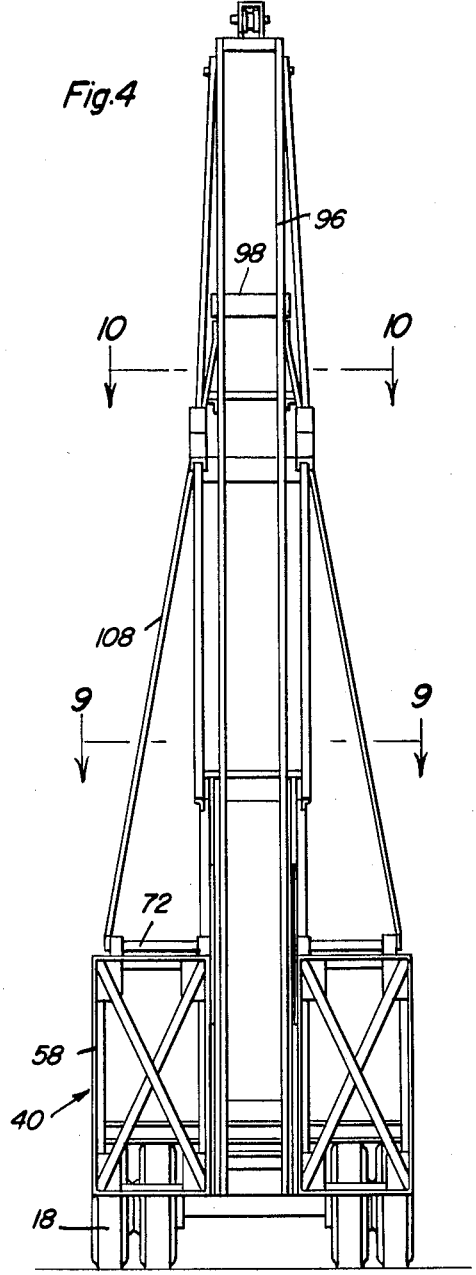
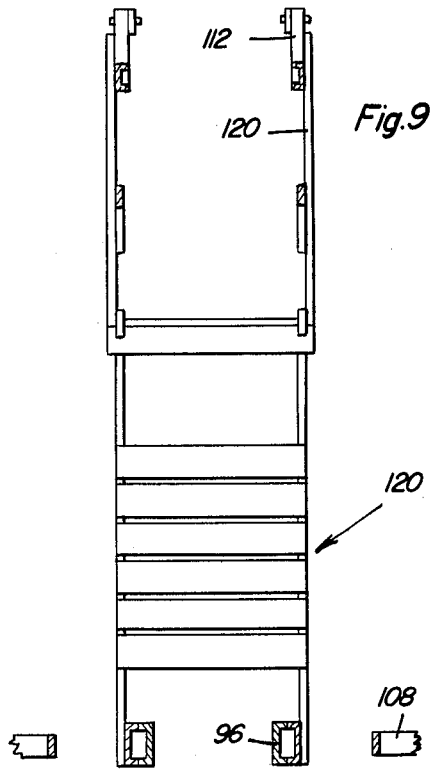
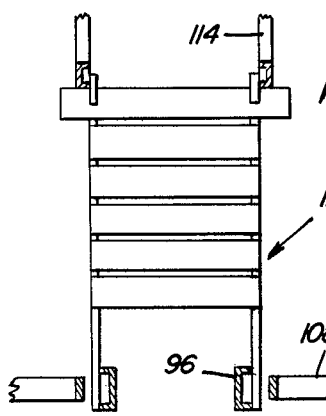
David E. Trottier
INVENTOR.

March 1, 1966     D. E. TROTTIER     3,237,354
MOBILE COLLAPSIBLE PILE DRIVER
Filed Nov. 23, 1960     5 Sheets-Sheet 5
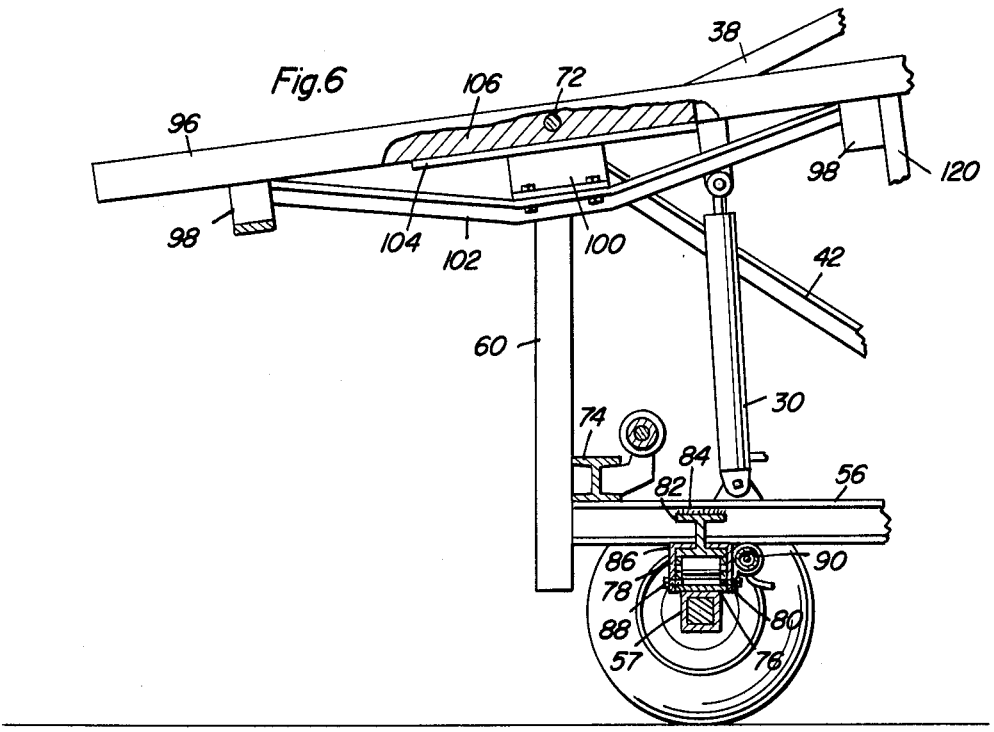
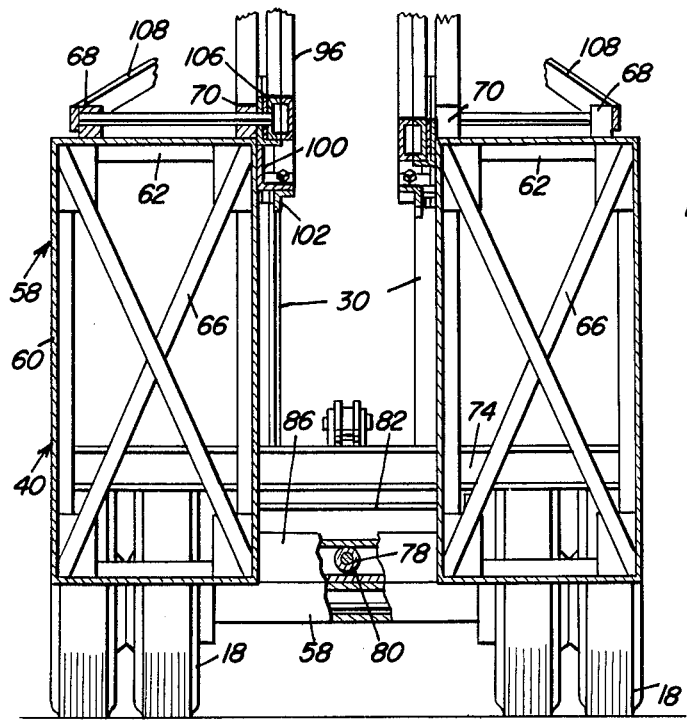
David E. Trottier
INVENTOR.
BY *Clarence A. O'Brien*
*and Harvey B. Jacobson*
Attorneys

United States Patent Office 3,237,354
Patented Mar. 1, 1966

3,237,354
MOBILE COLLAPSIBLE PILE DRIVER
David E. Trottier, Rte. 5, Box 750, Plant City, Fla.
Filed Nov. 23, 1960, Ser. No. 71,208
18 Claims. (Cl. 52—118)

This invention relates to a foldable wheeled structure which may be set-up at any desired installation to form a vertically erected column structure for pile driving purposes or the like.

It is therefore a primary object of this invention to provide a highly mobile column structure which is also maneuverable to a greater degree than comparable devices heretofore used for accurately lining the pile driver that may be supported by the column structure of the invention at the desired location.

Another object of this invention is to provide a collapsible column structure for pile drivers or the like which is rendered mobile by mounting on a wheeled frame and also is collapsible to a transport position on the wheeled frame in a most efficient manner providing adequate support for the column structure in the transport position.

A still further object of this invention is to provide a collapsible column structure for pile drivers or the like which is mounted on a vehicle frame for transport purposes in which position the column structure is disposed on the vehicle frame in a convenient and safe manner despite the collapse of a portion of the column structure by means of which it is rendered structurally rigid in its upright position. While in the transport position, the column members are locked in an alternatively braced condition in order to achieve the above-noted purpose.

An additional object of this invention is to provide a collapsible column structure which comprises a pair of interconnected column members pivotally mounted on a vehicle frame at a rear end thereof and adjacent one end of the column members. When in an upright position, the column members are rendered rigid by being interlocked with a foldable structure which supports the column members in their substantially horizontal transport position on the vehicle frame by means of a buckling joint which cooperates with a block on the forward end of the vehicle frame to support the column members on the vehicle frame at the forward end without any danger of the buckling joint being displaced from its transport supporting position. The pivotal support for the column members and hence the column structure itself is disposed at the rear end of the vehicle so that the vehicle frame may be pulled or backed into approximate position in front of the location above which the vertically erect column structure must be set-up. Once such a set-up is made, and the column structure locked in position, if the exact location is not correct, it will not be necessary to completely collapse the structure and then maneuver the vehicle toward the right location as was necessary in the past, since one of the most important features of the present invention includes the lateral maneuvering adjustment for the frame relative to the rear axle tube of the vehicle frame. Accordingly, by hydraulic power mechanism, the rear portion of the frame which is slidably movable to a limited amount relative to the rear wheel axle tube, may be laterally shifted in order to exactly aline a vertically erected column structure over the desired location without the necessity for collapsing the erected column structure, attaching a tractor and re-maneuvering the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the device illustrated in FIGURE 1.

FIGURE 3 is a side elevational view showing the device in an upright position ready for use.

FIGURE 4 is a rear elevational view of the device illustrated in FIGURE 3.

FIGURE 5 is a sectional view taken substantially through a plane indicated by section line 5—5 in FIGURE 2.

FIGURE 6 is a sectional view taken substantially through a plane indicated by section line 6—6 in FIGURE 5.

FIGURE 7 is a sectional view taken substantially through a plane indicated by section line 7—7 in FIGURE 2.

FIGURE 8 is a top plan schematic view of the wheeled supporting frame for the pile driver device of this invention.

FIGURE 9 is a sectional view taken through a plane indicated by section line 9—9 in FIGURE 3.

FIGURE 10 is a sectional view taken through a plane indicated by section line 10—10 in FIGURE 3.

Figure 1:
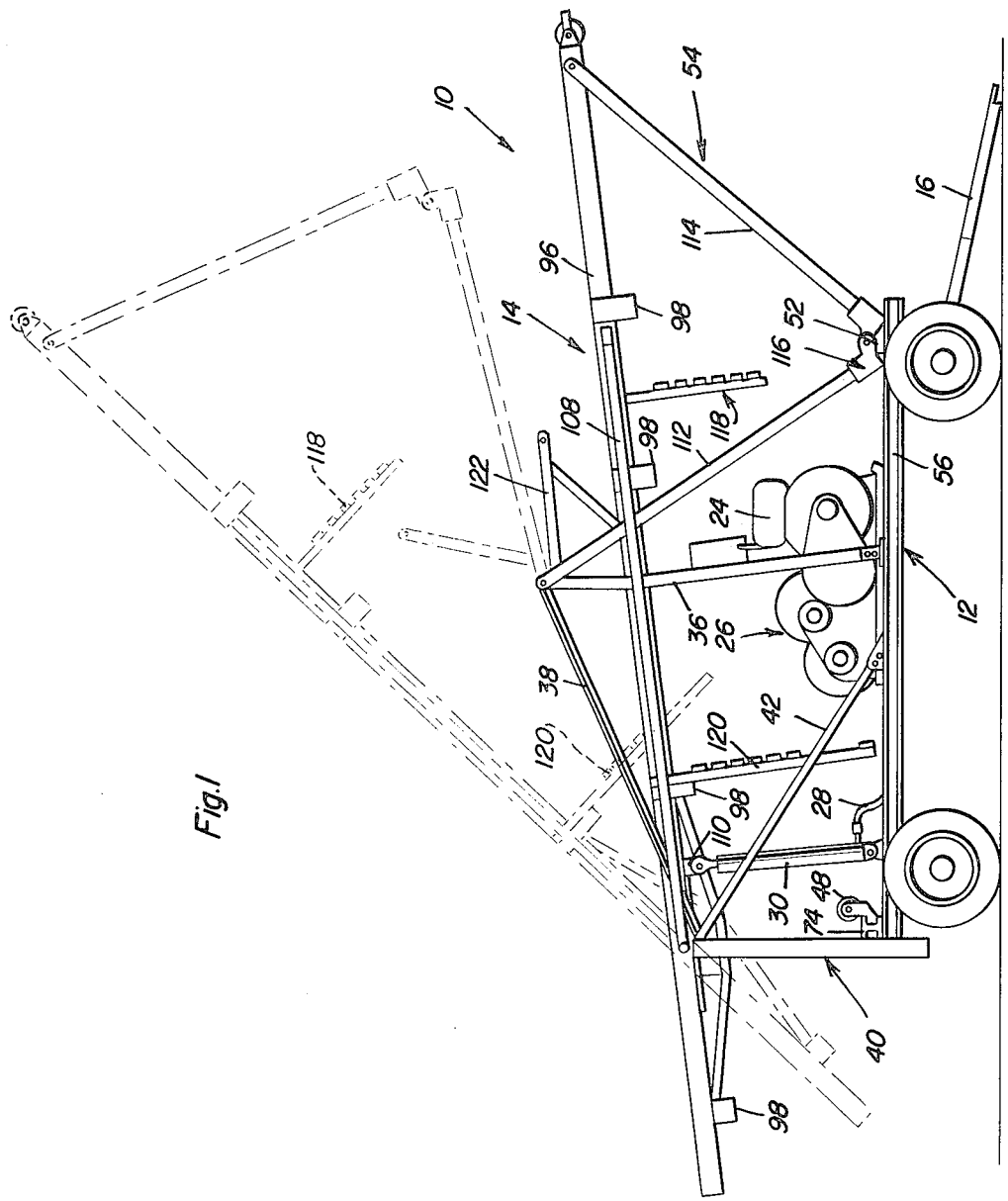
FIGURE 1 is a side elevational view of the mobile collapsible pile driver device of this invention shown in its transport position by solid line and by dotted line in an intermediate position.

Referring to the drawings in detail, attention is invited to begin with to FIGURES 1 and 3. It will be observed that in FIGURE 1 the wheeled structure forming the invention is generally referred to by reference numeral 10 and is shown by solid line in a transport position. The structure is shown in an intermediate position by dotted line in FIGURE 1 while in FIGURE 3 it is shown in an upright position for pile driving purposes. It will therefore be noted that the device 10 includes a wheeled chassis frame generally referred to by reference numeral 12 which supports thereon the column structure generally referred to by reference numeral 14 which is shown in collapsed position in FIGURE 1 and in its upright position in FIGURE 3. It will be noted that the vehicle frame 12 includes a hitch device 16 by means of which the vehicle which is of the trailer-type may be drawn by attachment to a tractor or truck or the like. The vehicle may accordingly be brought to a desired location and maneuvered to the exact position it is desired.

Referring more particularly to FIGURE 8 is will be observed that the vehicle frame includes a rear supporting wheel assembly 18 which is mounted with respect to the vehicle frame 12 on a fixed axis. The front dirigible wheel assembly 20 on the other hand is swivelly connected to the vehicle frame 12 and directly connected to the hitch device 16. It will therefore be apparent that the vehicle frame 12 may be maneuvered approximately into the proper or desired position for setting up the pile driving column structure. However, in order to facilitate accurate positioning of the equipment, once the vehicle frame 12 has been for example backed into position and it is noticed that it is slightly off from the exact location, a slight lateral adjustment of the frame 12 relative to the rear wheel assembly 18 may be sufficient to accurately locate the vertical column structure. Accordingly, the present invention includes mechanism as will hereafter be described with greater detail for laterally shifting the frame 12 relative to the rear wheel assembly 18 once the vehicle has been maneuvered into its final position.

As shown in FIGURE 8, by the arrow 22 the vehicle frame 12 has been laterally shifted relative to the rear wheel assembly 18 in the indicated direction as hereinbefore indicated. It will therefore be appreciated that a much easier and more accurate positioning of the cumbersome and extensive column structure may be accomplished by practice of this invention.

Referring now to FIGURES 1 and 3 in particular, it will be noted that the vehicle frame 12 has mounted thereon power equipment including for example a power source 24 which may be an internal combustion engine which is drivingly connected to a power winch mechanism 26 for the purpose of operating the pile driving equipment. The power equipment placed on the frame is shown schematically inasmuch as it forms no part of the present invention. It will therefore also be understood, that suitable pump mechanism will be provided on the frame (not shown) in order to hydraulically energize the hydraulic mechanisms. Accordingly, hydraulic line 28 is mounted on the frame 12 and operatively connected to the lower end of a hydraulic piston mechanism 30 which is pivotally connected to the frame adjacent the rear end thereof for the purpose of pivotally raising the column structure 14 from the position of FIGURE 1 to the position of FIGURE 3. The cylinder mechanism 30 accordingly includes a piston rod 32 which may be extended by the application of fluid under pressure into the cylinder 30 from the conduit 28 so that in its extended position as shown in FIGURE 3, the piston rod will cause the column structure 14 to be positioned in its upright condition. The piston rod 32 is accordingly pivotally connected at 34 to the column structure.

It will also be noted that the vehicle frame 12 has rigidly mounted thereon intermediate the ends thereof a pair of brace members 36 which brace members 36 straddle the equipment 24 and 26 by being connected to the frame 12 on the lateral outer sides thereof. Also a pair of connecting brace members 38 interconnect the intermediate brace members 36 with a rear pivot support assembly generally referred to by reference numeral 40. A further pair of brace members 42 therefore complete the braced frame structure formed by the intermediate brace members 36, rear pivot support assembly 40 and the connecting brace members 38. Accordingly, the intedmediate brace members 36 are connected to the frame assembly 12 by anchor connections 44 while the anchor connections 46 connect the lower ends of the members 42 to the vehicle frame 12. It will also be noted that a centrally disposed pulley member 48 is disposed above the frame 12 adjacent the rear end thereof so that the cable which may extend from the winch mechanism 26 may be trained thereabout and extend upwardly therefrom and about the upper pulley 50 when the column structure 14 is in its upright position as illustrated in FIGURE 3.

Disposed at the other or forward end of the vehicle frame 12 is the block member or stop 52 which cooperates with the collapsible column bracing structure generally referred to by reference numeral 54 in order to support in locked position the column structure 14 for transport purposes as illustrated by solid line in FIGURE 1.

The pivotal mounting for the column structure 14 is provided for by the aforementioned pivot support assembly 40. Referring therefore to FIGURES 5, 6 and 7 in particular it will be observed that the frame assembly 12 which is formed by a pair of elongated I beam members 56 supported on the rear wheel assembly 18 by means of the axle tube 57 thereof as will hereafter be explained with greater detail, has connected thereto a pair of interconnected vertically disposed structures 58. Each structure 58 extends beyond each lateral side of the frame assembly 12 and includes a pair of parallel angle members 60 interconnected by an upper angle member 62 and a lower angle member 64 forming a rectangular frame braced by cross members 66. Journal bearings 68 and 70 are mounted on the upper member 62 spaced from each other for rotatably receiving the shaft member 72 which is connected to the column structure 14 as will hereafter be explained with greater detail in order to accommodate pivotal movement of the column structure. The two vertically disposed pivot structures 58 are laterally spaced with respect to each other and supported on the I beam frame members 56 by means of a cross I beam member 74 which is attached to and seated on top of the rear ends of the frame members 56 of the vehicle frame 12. Accordingly, a rigid frame construction is formed between the pivot support assembly 40 and the frame 12.

As hereinbefore mentioned, the rear portion of the frame 12 to which the pivot support assembly 40 is connected is slidably movable to a limited extent and in a lateral direction relative to the rear wheel assembly 18. Referring therefore to FIGURES 6 and 7 in particular it will be observed that the axle tube 57 for the rear wheel assembly 18 has connected thereto as by welding a transverse channel member 76 which carries a plurality of pins 78 on which a plurality of roller members 80 are rotatably mounted. A transverse connecting I beam member 82 is disposed between the vehicle frame members 56 adjacent the rear end thereof and rigidly fastened thereto as by welding 84. The lower leg of the I beam member 82 slidingly engages the roller members 80 so as to accommodate relative movement between the axle tube 57 on which the rollers 80 are rotatably mounted by the channel member 76 and the frame 12 to which the I beam member 82 is connected. The sliding connection is protectively enclosed by a pair of angle members 86 as more clearly seen in FIGURE 6 which are fastened to the channel member 76 by fasteners 88 and slidably contacts the upper surface of the lower leg portion of the transverse I beam member 82. As more clearly seen from FIGURES 5 and 6, a power cylinder device 90 is fastened to the axle tube 57 by being clamped to one of the angle members 86 while the piston rod 92 thereof is pivotally connected to the frame member 56 of the frame 12. Accordingly, by introducing fluid under pressure through the conduits 94 which are connected to either end of the cylinder device 90 the frame 12 may be laterally displaced with respect to the axle tube 57 on which it is supported in a sliding manner by means of the rollers 80 in order to accomplish the lateral maneuvering heretofore referred to with reference to FIGURE 8.

As seen in FIGURES 1 and 3, the column structure 14 includes a pair of column members 96 which form the main part of the column structure and constitute the portion of the column structure that is pivotally mounted by the pivot support assembly 40. It will be noted that the column members 96 extend beyond the forward and rear ends of the frame 12 when in transport position while in the upright position of FIGURE 3 the column members 96 extend upwardly perpendicular to the ground with the lower end thereof being disposed above the ground but below the frame 12. As seen in FIGURES 2 and 4 the frame members are interconnected in parallel spaced relation to each other by a plurality of connecting bracket members 98. The members 96 are pivotally connected to the pivot support assembly 40 adjacent the rear end thereof at which portions the members 96 are accordingly reinforced. Referring therefore to FIGURE 6 in particular it will be observed that the members 96 which are formed by a pair of interconnected angle members have attached thereto a clamp plate 100 in the vicinity of the connection of the shaft 72 thereto. Angle iron truss structure 102 is thereby connected in spaced relation to the members 96 at the pivot location by means of the plate 100 while the spacer brackets 98 connect the angle iron member formation 102 at the opposite ends thereof to the column members 96. It will be observed that the plate member 100 is attached as by welding to an angle member 104 also attached to the column member 96 in the vicinity of its pivot connection to the pivot support assembly 40, a filter bar member 106 being disposed between the angle member 104 and the column member side so as to provide additional strength to the column member 96 at its rear portion. It will also be observed that the outer ends of the shaft 72 which are connected to the column members 96 and journalled within the brackets 68 and 70 have connected thereto lateral brace members 108 which are rigidly fastened to the sides of the column members 96 closer to the forward or upper ends thereof as more clearly seen in FIGURES 2 and 4. It will therefore be noted that adjacent to but spaced from the pivot portion of the column members 96 are the pivot connections 110 to which the piston rods 32 of the hydraulic cylinder mechanisms 30 are pivotally connected for pivotally raising the column members 96 and the attached structure when fluid is applied to the cylinder devices 30 through the conduit 28.

It will become apparent therefore, that the column members 96 while in their upright position of FIGURE 3 require additional structure for resisting the bending thereof to which it will be subjected by the pile driving load. Also, bracing and supporting structure will be required for the column members 96 while in their transport position. The collapsible mechanism 54 is therefore provided for such purpose. It will therefore be noted in FIGURE 1, that the collapsible mechanism 54 includes a pair of link structures 112 and 114 which are interconnected by a knuckle joint 116. The joint 116 is so designed that pivotal movement between the structures 112 and 114 will be limited to a position in which the structures 114 and 112 are axially aligned as illustrated in FIGURE 3 in which condition the mechanism 54 will position the column members 96 in their vertical position. Accordingly, the upper end of the structure 114 is pivotally connected to the upper end of the column members 96 on either side thereof while the lower end of the structure 112 is pivotally connected to the upper end of the intermediate brace member 36.

When the structures 112 and 114 are in their buckled condition as illustrated in FIGURE 1 the knuckle joint 116 thereof will rest upon the forward end of the vehicle frame 12 and be locked thereto by means of the block 52. In said latter condition, the column members 96 will be supported at the rear end of the frame by the pivot support assembly 40 and at the front end of the frame 12 by the collapsible mechanism 54 in an adequate and safe manner by virtue of the block 52 preventing the knuckle joint 116 from being displaced on the frame 12. It will be observed that in the collapsed condition, the mechanism 54 will so position the column members 96 that the front end thereof will be above the rear end a slight amount so that the column members 96 will extend above any pulling vehicle to which the device may be hitched. Also, the upper end of the brace members 36 will be disposed intermediate the vehicle frame and not too far above the column members 96 so as to afford height clearance for the collapsed column structure.

It will be observed in FIGURE 1 that the column members 96 have rigidly attached thereto a pair of projecting assemblies 118 and 120. The assemblies 118 and 120 as seen in FIGURE 1 project downwardly from the column members 96 substantially perpendicular thereto. Also, it will be observed from FIGURE 1 that the structure 112 adjacent to its pivotal connection to the intermediate brace member 36 has a projecting structure 122 which extends forwardly therefrom. Referring now to FIGURE 3, it will be observed that the relative position to the structure 113 to the column members 96 is such that the projecting assembly 118 is engaged thereby as more clearly seen in FIGURE 10 so as to thereby lock the structure 114 to the column members 96 to form a reinforced column structure. Also, the assembly 120 projecting from a lower portion of the column members 96 engages the projecting assembly 122 which is attached to the structure 112 as more clearly seen in FIGURE 9. It will therefore be apparent that the column members 96 will be locked with respect to both structures 112 and 114 to form a reinforced column structure which will constitute (as seen in FIGURE 3) a continuation of the column structure formed at the bottom by the bottom portions of the column members 96 and the intermediate brace members 36 additonally braced by the members 38 and 42 as hereinbefore indicated.

From the foregoing description, operation and utility of the structure of this invention will be apparent. It will therefore be appreciated that the bottom portion of the column structure of this invention will be fixedly formed and mounted on the vehicle frame 12 by means of the pivot support assembly 40 which is disposed perpendicular to the vehicle frame and rigidly interconnected with the intermediate brace members 36 by means of members 38 and 42 so that the erected column structure 14 will form as a continuation thereof the reinforced column structure as hereinbefore explained. When collapsed however the assembly 40 and intermediate bracing members 36 form a convenient support for the column members 96 together with the collapsed mechanism 54 in which latter position it supports the forward projecting end of the column members 96 on the forward end of the vehicle frame 12 through the block 52 thereon cooperating with the knuckle joint 116. The interlocking assemblies 118 and 120 in the latter mentioned transport position of the column structure will conveniently be disposed below the column members 96 in a safe position. Also, the pivotal support for the column structure and the lateral adjustment feature thereof relative to the rear wheel axle tube renders the novel foldable column structure maneuverable to a degree not expected from the mere fact that it is mounted on a wheeled vehicle frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile collapsible pile driver comprising, wheeled frame means, pivot support means mounted on said frame means at one end thereof, elongated column means pivotally connected adjacent one end to the pivot support means spaced above the frame means, collapsible means operatively connected to the other end of the column means and to the frame means spaced from the pivot support means for limiting pivotal movement of the column means to an upright position, support said other end of the column means means mounted at the other end of the frame means for locking engagement with the collapsible means in folded condition when the column means is in a transport position.

2. The combination of claim 1, wherein said collapsible means comprises a pair of link means, a knuckle joint interconnecting said link means, said locking engagement means including block means mounted at said other end of said frame means for engagement with said knuckle joint to lock and support the column means in its transport position.

3. The combination of claim 1, including interengaging means operatively connected to the column means and collapsible means operative to engage and form a rigid column structure between the column means and collapsible means when the column means is in upright position.

4. The combination of claim 1, wherein said frame means is slidably movable in a horizontal plane at said one end relative to the other end for maneuverability purposes.

5. The combination of claim 1, including selectively operable power means mounted on the frame means adjacent the rear end thereof and operatively connected to the foldable column means and pivot support means respectively for pivotally raising the column means to an upright position and laterally shifting the frame means relative to the wheel means.

6. The combination of claim 1, including interengaging means operatively connected to the column means and collapsible means operative to engage and form a rigid column structure between the column means and collapsible means when the column means is in upright position.

7. The combination of claim 6, wherein said collapsible means comprises a pair of link means, a knuckle joint interconnecting said link means, said locking engagement means including block means mounted at said other end of said frame means for engagement with said knuckle joint to lock and support the column means in its transport position.

8. The combination of claim 7, wherein said frame means is slidably movable in a horizontal plane at said one end relative to the other end for maneuverability purposes.

9. The combination of claim 1 wherein said collapsible means includes a first link structure pivotally mounted on the frame means intermediate the ends thereof, a second link structure pivotally connected to the column means at said other end thereof and pivot joint means interconnecting said link structures for forming a rigid assembly when longitudinally aligned, supporting the column means in said upright position.

10. The combination of claim 9, wherein said means mounted at the other end of the frame means comprises, a stop block engageable by the pivot joint means when the column means is in the transport position locking the joint means and link structures in a supporting position supporting said other end of the columns beyond said other end of the frame means.

11. A mobile collapsible pile driver comprising, dirigible wheel means, supporting wheel means, frame means displaceably carried by both of the wheel means, pivot support means fixedly mounted on the frame means adjacent the supporting wheel means, foldable column means pivotally mounted on the pivot support means and column maneuvering means mounted on the frame means and operatively connected to the supporting wheel means for lateral displacement of the frame means and the column means in a horizontal plane relative to the supporting wheel means.

12. The combination of claim 11, wherein said dirigible wheel means includes a swivel wheel assembly supporting a forward end of the frame means and said supporting wheel means includes an axle tube supporting a rear end of the frame means.

13. The combination of claim 12, wherein said column maneuvering means comprises roller means rotatably mounted on the axle tube, slidable means mounted on the frame means at said supporting end thereof and slidingly engageable with said roller means for limited lateral movement of the frame means relative to the axle tube.

14. The combination of claim 13, including selectively operable power means mounted on the frame means adjacent the rear end thereof and operatively connected to the foldable column means and pivot support means respectively for pivotally raising the column means to an upright position and laterally shifting the frame means relative to the wheel means.

15. A method for positioning a column mounted on a frame supported between steerable and non-steerable wheel assemblies comprising the steps of: moving the wheeled frame with the column in transport position adjacent to a predetermined location; erecting said column over the non-steerable wheel assembly; maneuvering said wheeled frame by said steerable wheel assembly to a position wherein said erected column is at least spaced within limits from vertical alignment with said predetermined location; and horizontally displacing said frame relative to said wheel assemblies to displace the column into accurate vertical alignment with said predetermined location.

16. The method of claim 15, wherein said step of maneuvering the frame includes displacing the frame along the non-steerable wheel assembly about an axis established through said steerable wheel assembly.

17. In combination with a wheeled frame having opposite ends, pivot support means mounted at one of said opposite ends of the frame, elongated column means having opposite end portions, means pivotally connecting said column means to the support means adjacent to and spaced from one of said opposite end portions, a pair of link members respectively pivotally connected to the frame intermediate the opposite ends thereof and to the column means at the other of said opposite end portions, pivot joint means interconnecting said link members for limiting pivotal movement of the column means to an upright position, and stop means mounted on the frame adjacent the other of said opposite ends for engagement with the pivotal joint means for locking the link members on the frame, supporting the column means in a transport position at the other end portion thereof spaced beyond said other end of the frame.

18. The combination of a trailer vehicle and a column assembly mounted thereon comprising, elongated frame means having opposite end portions, dirigible wheel means pivotally connected at one end portion for support thereof, supporting wheel means slidably mounting the frame means at the other end portion thereof, foldable column means fixedly mounted on the frame means over the supporting wheel means, and power operated means selectively operable to slidably displace the frame means relative to the supporting wheel means for positioning of the foldable column means.

References Cited by the Examiner

UNITED STATES PATENTS

| | | | |
|---|---|---|---|
| 517,932 | 4/1894 | Pauley et al. | 52—109 X |
| 578,848 | 3/1897 | Wood | 182—127 |
| 2,595,307 | 5/1952 | Selberg | 52—115 |
| 2,634,831 | 4/1953 | Haisch | 52—118 |
| 2,659,584 | 11/1953 | Dorkins | 175—154 |
| 2,664,976 | 1/1954 | Woolslayer | 52—119 |
| 2,780,325 | 2/1957 | Woolslayer | 52—143 X |

FOREIGN PATENTS

| | | |
|---|---|---|
| 727,780 | 4/1955 | Great Brtain. |

RICHARD W. COOKE, JR., *Primary Examiner.*

JOEL REZNEK, *Examiner.*